(12) United States Patent
Strahler

(10) Patent No.: US 7,083,756 B2
(45) Date of Patent: Aug. 1, 2006

(54) METHOD FOR PRODUCING A TOOTHBRUSH

(75) Inventor: Reto Strahler, Adligenswil (CH)

(73) Assignee: Trisa Holding AG, Triengen (CH)

( * ) Notice: Subject to any disclaimer, the term of this patent is extended or adjusted under 35 U.S.C. 154(b) by 0 days.

(21) Appl. No.: 10/220,121

(22) PCT Filed: Dec. 17, 2001

(86) PCT No.: PCT/CH01/00720

§ 371 (c)(1),
(2), (4) Date: Mar. 12, 2003

(87) PCT Pub. No.: WO02/052982

PCT Pub. Date: Jul. 11, 2002

(65) Prior Publication Data

US 2004/0113312 A1 Jun. 17, 2004

(30) Foreign Application Priority Data

Dec. 28, 2000 (DE) ................... 100 65 517

(51) Int. Cl.
*B29C 45/02* (2006.01)
*B29C 45/14* (2006.01)
*B29C 45/16* (2006.01)
(52) U.S. Cl. ............... 264/328.8; 264/255; 264/294; 264/308
(58) Field of Classification Search ........... 264/328.1, 264/328.8, 328.14, 328.18, 255
See application file for complete search history.

(56) References Cited

U.S. PATENT DOCUMENTS 2,923,035 A * 2/1960 Schwartz .............. 264/247
4,535,014 A * 8/1985 Wright ................. 428/30

(Continued)

FOREIGN PATENT DOCUMENTS

DE 9402418 U * 5/1994

(Continued)

OTHER PUBLICATIONS

WO-A-94/05183.*

(Continued)

*Primary Examiner*—Michael P. Colaianni
*Assistant Examiner*—Monica A Huson
(74) *Attorney, Agent, or Firm*—Oliff & Berridge, PLC

(57) ABSTRACT

A method for efficiently producing injection molded toothbrush handles wherein two or more adjacent cavities in a mold are respectively configured to mold a first portion of a handle and a second portion of a handle, wherein upon injection molding of the first portion in a first cavity, the second portion is simultaneously injected into a second cavity into which a previously molded fist portion has been placed after its removal from the first cavity, thereby to immediately contact the previous first portion with the newly injected second portion. A third portion may also be injected into a third cavity into contact with a previously injection molded contacting first and second toothbrush handle portion. In this manner, seriatim transfer of the said portions between cavities enhances product output. The handle may include transparent or translucent portions.

10 Claims, 5 Drawing Sheets

U.S. PATENT DOCUMENTS

| | | | | |
|---|---|---|---|---|
| 4,660,830 A | * | 4/1987 | Tomar | 473/601 |
| 5,256,048 A | * | 10/1993 | Jacobs et al. | 425/130 |
| 5,609,890 A | * | 3/1997 | Boucherie | 425/120 |
| 5,761,759 A | * | 6/1998 | Leversby et al. | 15/167.1 |
| 5,765,906 A | * | 6/1998 | Iwatsuki et al. | 296/203.03 |
| 5,769,506 A | * | 6/1998 | Boucherie | 300/2 |
| 5,817,345 A | * | 10/1998 | Koch et al. | 425/130 |
| 5,860,190 A | * | 1/1999 | Cano | 16/422 |
| 6,276,019 B1 | * | 8/2001 | Leversby et al. | 15/167.1 |
| 6,276,020 B1 | * | 8/2001 | Leversby et al. | 15/167.1 |
| 6,292,973 B1 | * | 9/2001 | Moskovich et al. | 15/167.1 |
| 6,379,139 B1 | * | 4/2002 | Boucherie | 425/129.1 |
| 6,402,494 B1 | * | 6/2002 | Lanvers | 425/116 |
| 6,679,696 B1 | * | 1/2004 | McConnell et al. | 425/112 |

FOREIGN PATENT DOCUMENTS

| | | | |
|---|---|---|---|
| EP | 0678368 A | * | 10/1995 |
| EP | 0893225 A | * | 1/1999 |

OTHER PUBLICATIONS

WO 02/06034.*

WO 99/01055A.*

* cited by examiner

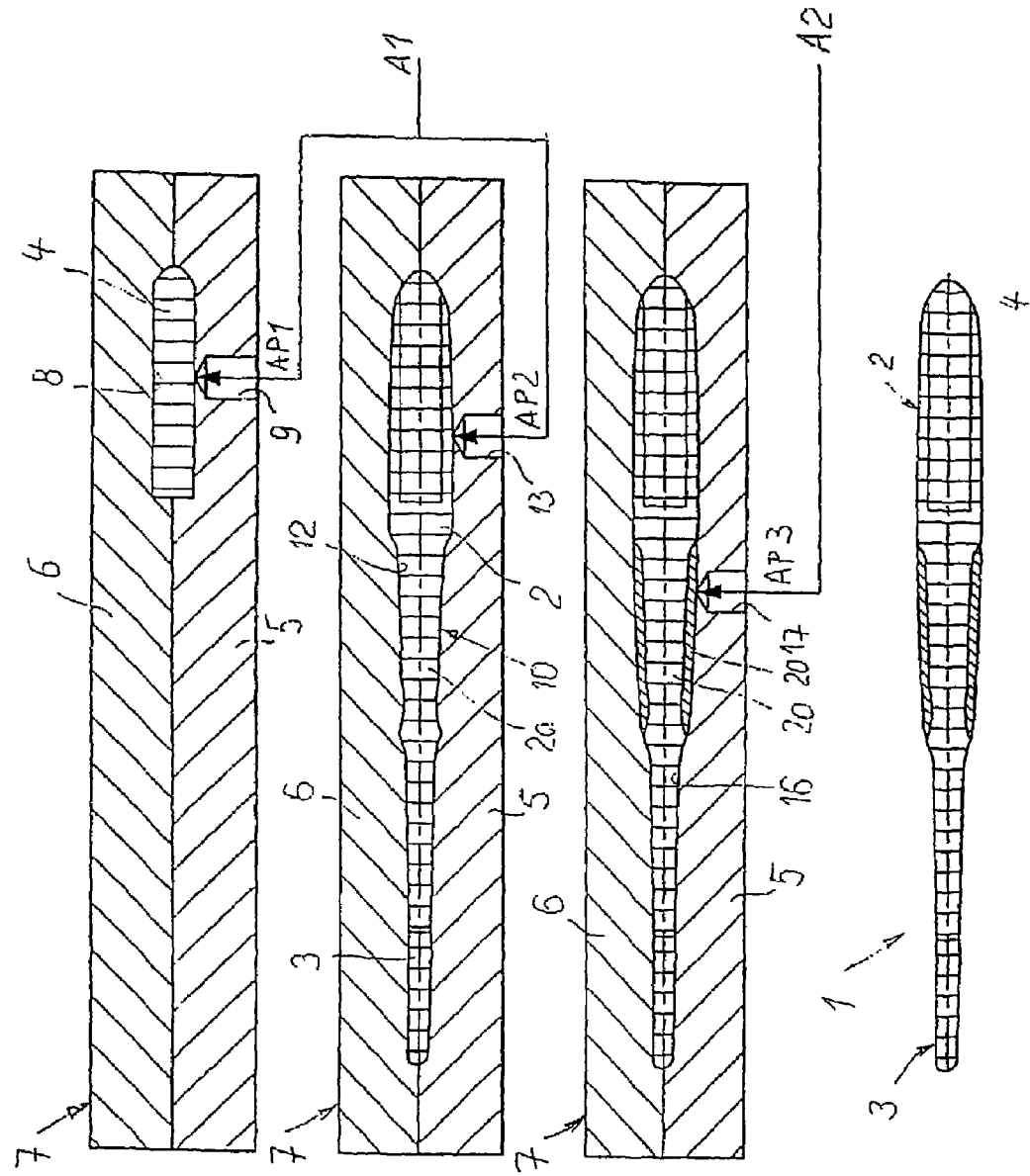

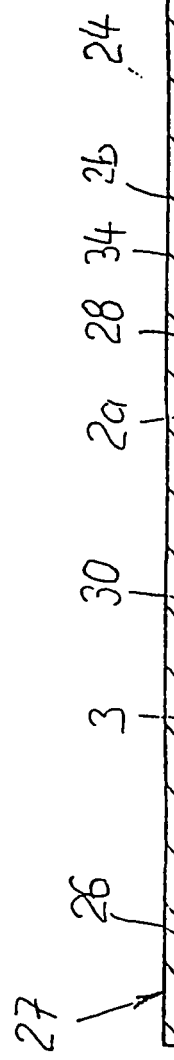
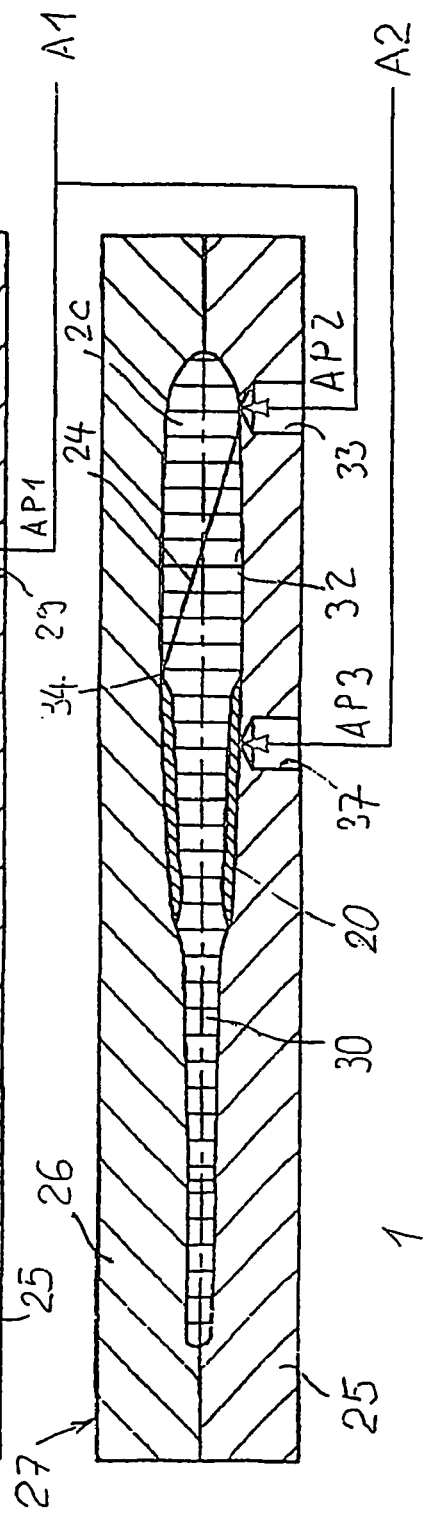
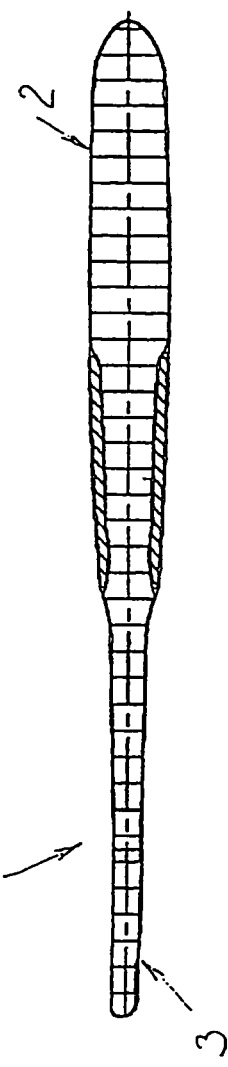
Fig. 6
Fig. 7
Fig. 8

METHOD FOR PRODUCING A TOOTHBRUSH

CROSS-REFERENCE TO RELATED APPLICATIONS

The subject application is based upon International Application PCT/CH01/00720 filed Dec. 17, 2001, now WO 02/052982 dated Jul. 11, 2002.

BACKGROUND OF THE INVENTION

WO-A-94/05183 discloses a method for producing a toothbrush consisting of two different material components, in which method, in a first step, the main body of the toothbrush is injected from a first material component, for which purpose a first cavity is provided. Thereafter, in a second cavity, a further material component, for example an elastic and/or nonslip material, is injected onto various parts of the main body. The main body has a relatively narrow cross section both in its area supporting the bristles and also in its handle area.

In order to improve the grip of toothbrushes and to permit comfortable handling, it is advantageous to make the toothbrush relatively solid in its handle area, i.e. to give the handle a relatively large cross section. However, this kind of handle design entails a number of disadvantages from the point of view of production technology. Not only is more material used as a result of the greater volume of the handle; the injection time and cooling time are also hugely increased by the greater mass, and the injection-molding process is thus prolonged (longer molding time). In addition, such handle parts with a relatively large cross section have a tendency to cavitation (i.e. formation of air bubbles) which are visible in handles made of a transparent material and detract from the esthetic effect of the toothbrush.

BRIEF SUMMARY OF THE INVENTION

The object of the present invention is to propose a method of the type mentioned at the outset which guarantees short injection intervals when producing a toothbrush with a solid handle of large cross section.

In this regard, two or more toothbrush handle portions are separately and serially injection molded in a plural cavity die set to facilitate the formation of handles having distinct differing portions. Further, the die set may effect the simultaneous similar molding of plural handles, and wherein one or more plastic supply injectors may be employed.

BRIEF DESCRIPTION OF THE DRAWINGS

The invention is explained in greater detail below with reference to the drawing.

Three variants of the method according to the invention are illustrated in the drawing and are described in greater detail below.

Figure 5:
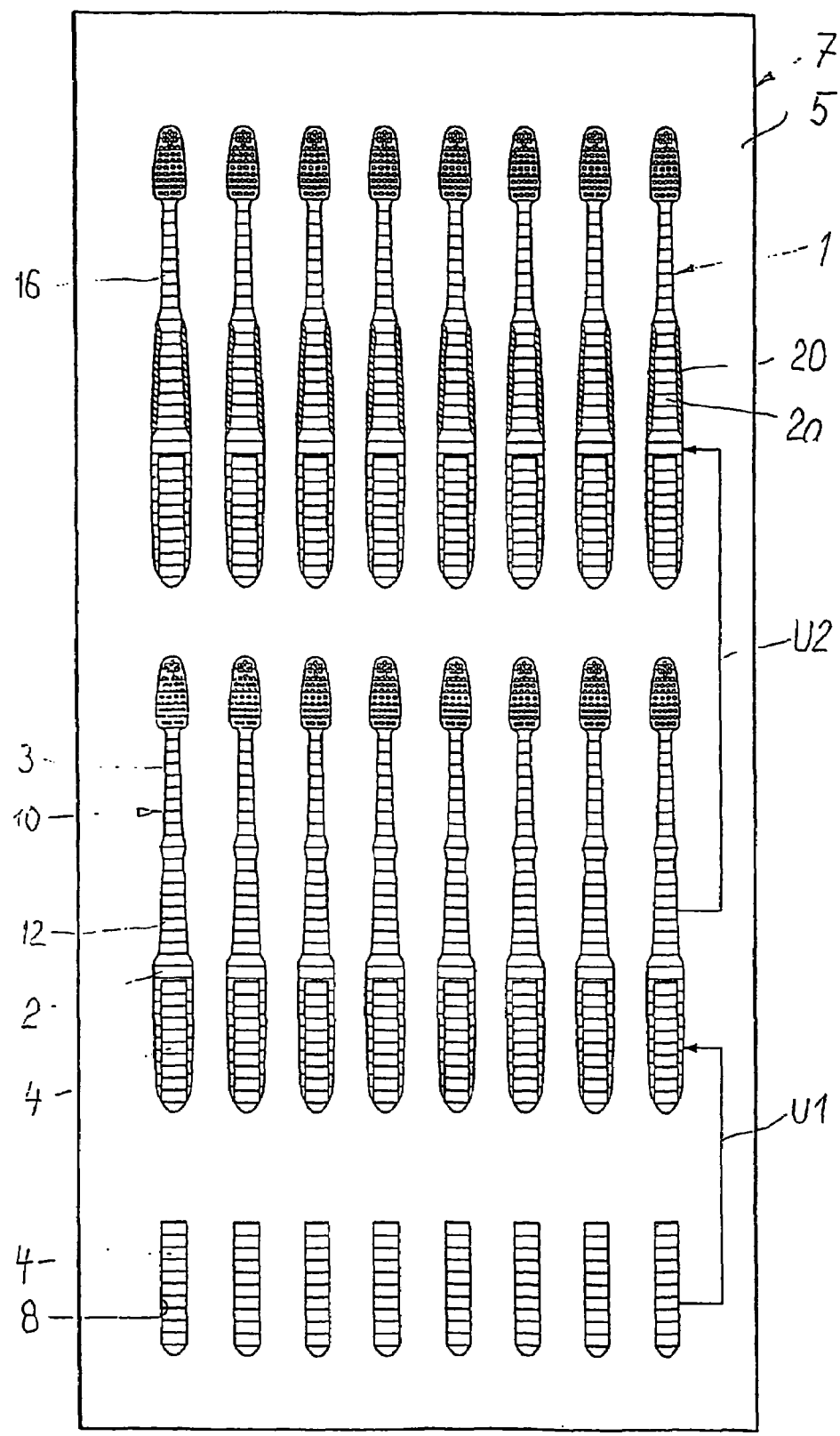

In the drawing, which is purely diagrammatic:

FIG. 1 is illustrative of a first molding method wherein the first step comprises injection molding a toothbrush handle first insert element;

FIG. 2 illustrates the second step of a first molding method wherein the molded insert element of FIG. 1 is associated with a newly injected handle portion;

FIG. 3 illustrates the third step of a first molding method wherein the handle with the first molded insert element of FIG. 2 is associated with a newly injected second insert element;

FIG. 4 shows in a side view, and partially in cross section, a toothbrush produced according to the method steps in FIGS. 1 to 3;

FIG. 5 shows a plan view of part of an injection mold for the first method variant;

FIG. 6 is illustrative of a second molding method wherein the first step comprises injection molding a major handle portion of a toothbrush;

FIG. 7 illustrates the second step of a second molding method wherein the major handle portion of FIG. 6 is associated with respective injection molded terminal and lateral inserts thereto.

Figure 9:
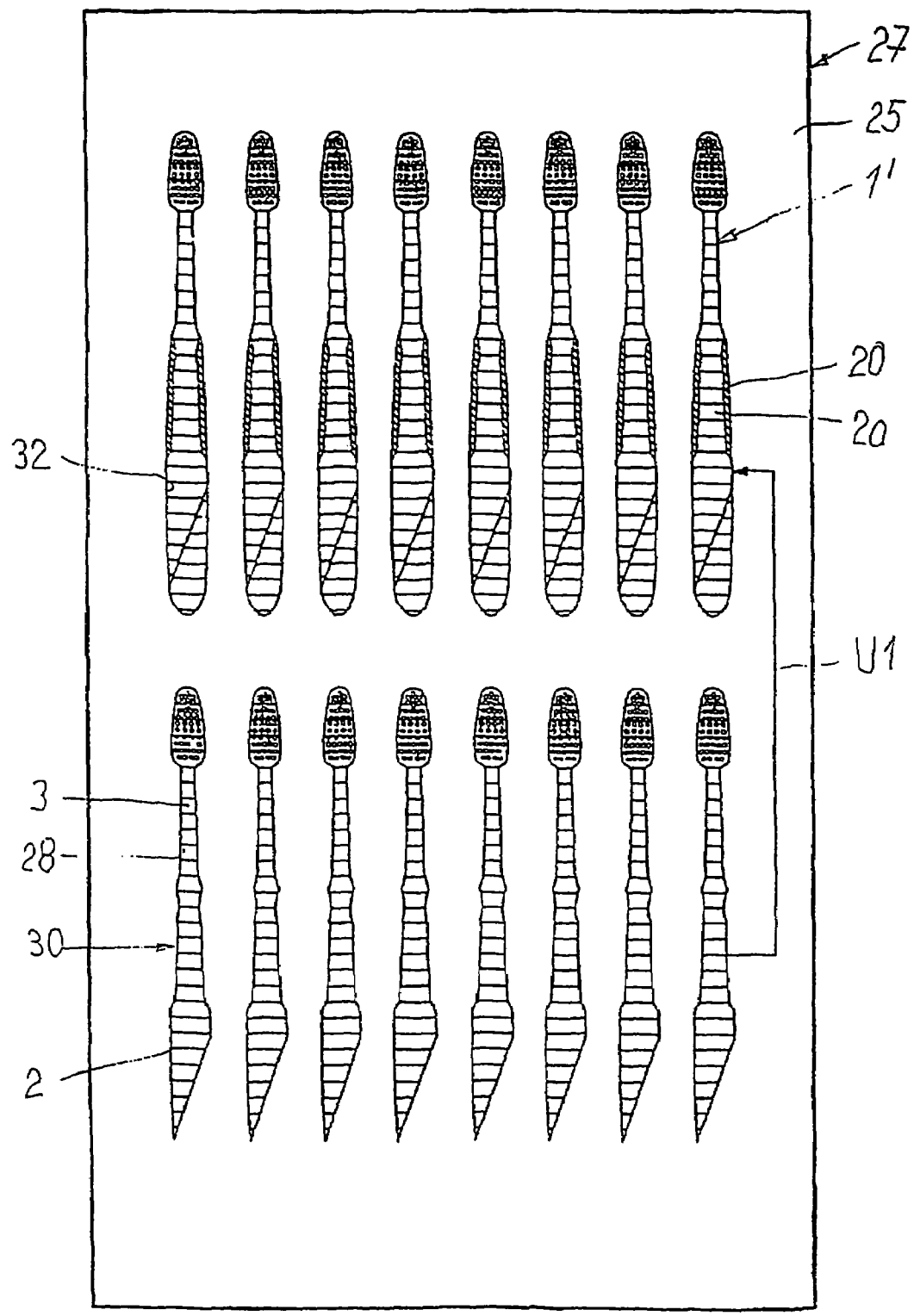
Figure 10:
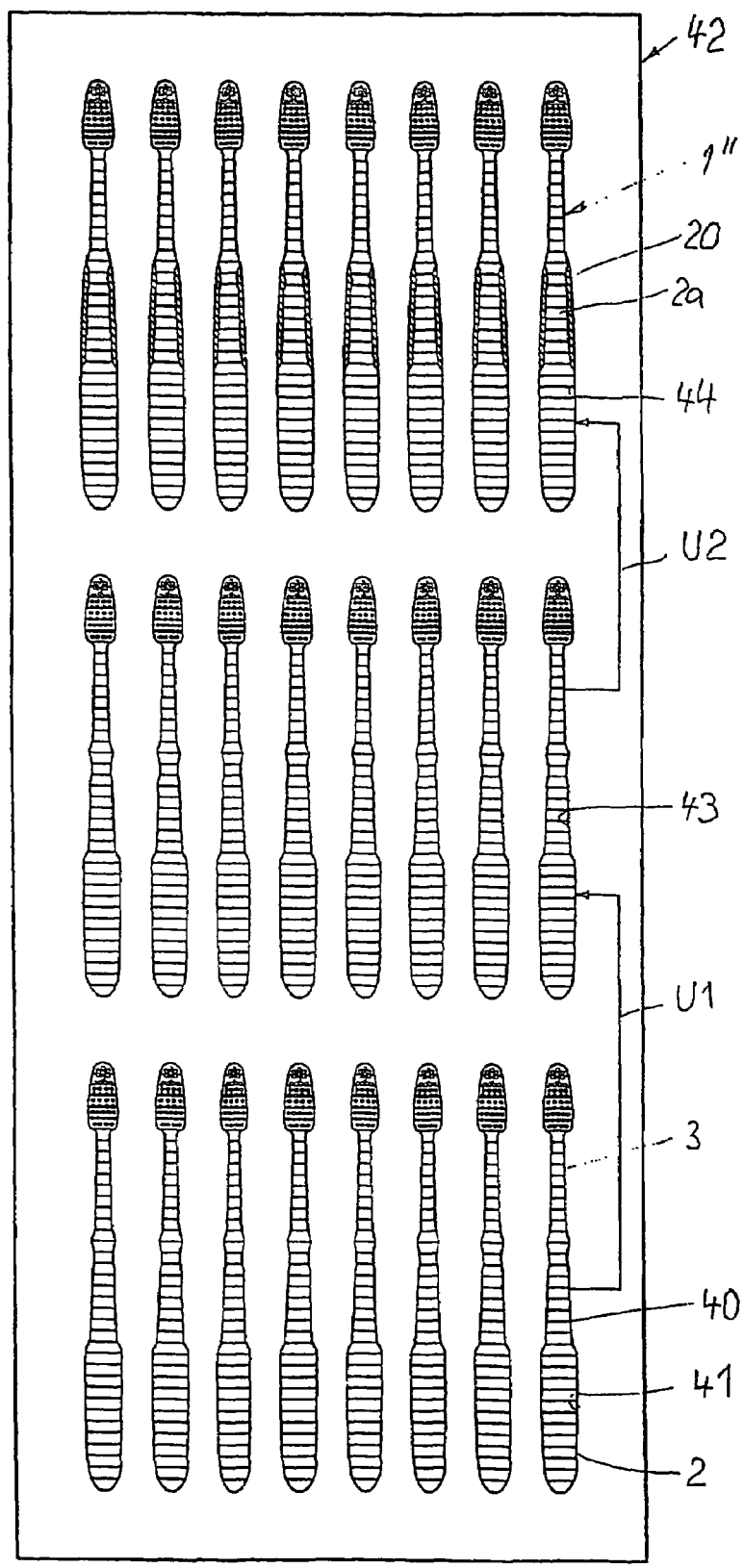

FIG. 8 shows in a side view, and partially in cross section, a toothbrush produced according to the method steps in FIGS. 6 and 7;

FIG. 9 shows a plan view of part of an injection mold for the second method variant; and FIG. 10 shows a plan view of part of an injection mold for a third method variant.

DETAILED DESCRIPTION OF THE INVENTION

To produce a toothbrush 1 which is shown in FIG. 4 and whose handle 2 has a larger cross section than the front head part 3 provided for securing the bristles or tufts, an inner part 4 of the handle 2 is first prepared in a first step shown in FIG. 1. For this purpose, a first portion of the first material component provided for the handle 2 (and if appropriate also for the head part 3) is injected into a first cavity a formed between two parts 5, 6 of an injection mold 7. The first injection point for the first material component delivered from a first unit A1 is indicated by AP1 in FIG. 1, while the injection channel or injection nozzle provided for this is indicated by 9.

As can be seen from FIG. 5, the injection mold 7 is provided for the production of a plurality of toothbrushes 1, if appropriate eight tooth brushes 1. After partial cooling and hardening (as soon as sufficient inherent stability is achieved), the inner parts 4 injected in the first step according to FIG. 1 are transferred in each case into a second cavity 12, shown in FIG. 2, using a generally known transfer system (not shown in the drawing), for example a so-called internal handling system arranged on the injection-molding tool, an external rotary or linear handling system, or robots. This first transfer is indicated symbolically with an arrow U1 in FIG. 5.

The inner part 4 can have support knobs (not shown in FIG. 1) which protrude in the radial direction and by means of which the inner part 4 is supported on the wall of the second cavity 12, in order to be held centrally there.

In a second step shown in FIG. 2, a second portion, if appropriate the remaining portion, of the first material component is injected into the second cavity 12 via an injection channel or an injection nozzle 13. The second injection point AP2 for the first plastic component is offset in relation to the first injection gate AP1, viewed in the longitudinal direction of the toothbrush to be produced. The second portion of the first material component comes into direct contact with the first portion; in the illustrative embodiment shown, material is injected around the inner part 4, the handle 2 acquires the desired solid shape in its rear area, and the front head part 3 of narrower cross section is also obtained. Thus, a main body of the toothbrush 1 is formed which consists of the first material component and is indicated by 10 in FIGS. 2 and 5. To inject both portions of the first material component, only one unit A1 is preferably used, as is indicated in FIGS. 1 and 2. However, the two portions of the same material could also be injected from two different units and could for example have different colors.

In the method variant according to FIGS. 1 to 5, in a third step, a further material component, for example a material which is more elastically resilient compared to the first material component, e.g. a thermoplastic elastomer (TPE), is finally injected around the front area of the handle 2. For this purpose, the main body 10 consisting of the first material component is transferred into a third cavity 16 of the injection mold 7 after the second portion has cooled and hardened, in which case once again the second transfer of all eight main bodies 10, indicated by the arrow U2 in FIG. 5, is effected by means of a suction tool (not shown).

According to FIG. 3, the second material component is injected into the third cavity 16 from a further unit A2 via an injection channel or injection nozzle 17 at a third injection point AP3, material being injected around a front part 2a (FIGS. 2 and 3) of the handle 2 and a kind of coating thus being formed over part of the length of the handle. Such a grip part 20 can contribute, for example, to a further improvement in the gripping of the toothbrush 1. It is of course possible to add further material components into further cavities.

FIGS. 6, 7 and 9 show a further method variant for producing a toothbrush 1' which is shown in FIG. 8 and which once again has a front head part 3 and a handle 2 of greater cross section compared to the latter. In a first step in this variant, according to FIG. 6, the head part 3, a front part 2a of the handle 2, and a part 2b of the rear part of the handle with increased cross section, are injection-molded from a first material component and together form a main body 30 of the toothbrush 1'. The first cavity provided for this purpose and formed between two parts 25, 26 of an injection mold 27 is indicated by 28 in FIG. 6. This first cavity 28 is designed in such a way that the part 2b of the handle 2 has an upper injection surface 24 extending at an inclination relative to the longitudinal direction of the toothbrush 1' to be produced; the injection surface 24 could of course extend in another direction. At an injection point AP1, a first portion of the first material component from a first unit A1 is injected into the first cavity 28 via an injection channel or injection nozzle 29. As can be seen from FIG. 9, a number of main bodies 30, possibly eight main bodies, are once again produced in one injection mold 27 and, after partial cooling and hardening, are transferred into a second cavity 32 shown in FIG. 2 by means of a transfer system (not shown). This transfer is indicated with an arrow U1 in FIG. 9.

In a second step shown in FIG. 7, the second, remaining portion of the first material component is injected via an injection channel or an injection nozzle 33, preferably from the same unit A1 as the first portion, into the second cavity 32 at a rear, second injection point AP2 which lies behind the injection surface 24 of the main body 30 located in the cavity 32. Here too, however, an additional unit could be made available for the second portion. The remaining part 2c (FIG. 7) of the handle 2 is formed by the second portion of the first material component injected onto the injection surface 24 of the cooled handle part 2b. In this variant, the main body 30 is designed in such a way that the space in the second cavity 32 provided for injecting this second portion (or for forming the remaining handle part 2c) is separated from a space of the second cavity 32 provided for the injection of a second second material component surrounding the front handle part 2a, this separation being effected by a peripheral surface 34 of the inserted main body 30 which is located at the transition between the front part 2a and the part 2b of the handle 2 provided with the injection surface 24. Thus, simultaneous with the injection of the second, remaining portion of the first material component, it is also possible to inject the second material component, specifically from another unit A2, at a third injection point AP3, via an injection channel (or injection nozzle) 37 opening into the second cavity 32. Here too, in order to improve its grip, the handle 2 is provided with the grip part 20 consisting, for example, of an elastically more resilient material component. If necessary, the injection of the first and second material component could take place sequentially.

Accordingly, in the second method variant according to FIGS. 6, 7 and 9 (in contrast to the first variant according to FIGS. 1 to 3 and FIG. 5), only two cavities 28, 32 are needed for each toothbrush 1', and only one transfer U1 is required.

Both in the first method variant and in the second method variant, by dividing the injection-molding of the handle 2 of thickened cross section into two operating steps, i.e. by injection-molding the same material in two portions, the injection time and the cooling time are substantially reduced, i.e. shorter injection intervals are permitted, and in addition the formation of cavities is avoided. The last-mentioned advantage is of particular importance in transparent or translucent handles. The separating lines, or in the case of transparent material the separating surfaces, between the handle parts injected in the individual portions are barely visible. Of course, these handle parts (and the cavities required for them) could have a different form than that represented and described in the illustrative embodiments according to FIGS. 1 to 5 and FIGS. 6 to 9. It would also be entirely possible for the handle of thickened cross section to be injected in more than two portions, and to provide an additional cavity for each further portion.

The production of a two-component toothbrush 1, 1' has been described with reference to FIGS. 1 to 5 and FIGS. 6 to 9, respectively. A one-component toothbrush, i.e. a toothbrush consisting of a single material component, could of course also be injection-molded in two or more portions according to the invention.

A two-component toothbrush could also be of a quite different configuration than that shown in FIG. 4 or 8. For example, the head part 3 could be made from another material component than the handle 2. In this case, the material component provided for producing the handle 2 of greater thickness than the head part 3 could advantageously be injected in two portions of approximately the same size.

In a multi-component toothbrush, however, a number of material components can according to the invention also be divided into two or more portions which are injected sequentially. For each component which is divided up, an additional cavity per portion is of course required.

A further method variant for producing a toothbrush, if appropriate once again a two-component toothbrush 1", is indicated in FIG. 10. In a first step, a main body 40 of this toothbrush 1", which has a head part 3 and a handle 2 of larger cross section, is produced by injecting a first material component into a first cavity 41 of an injection mold 42, the first material component being completely injected into the first cavity 41 in this variant. Accordingly, as soon as sufficient inherent stability is achieved after partial cooling and hardening, the main body 40 is transferred into a cooling cavity 43 by means of a suction tool (not shown), which transfer is indicated with an arrow U1 in FIG. 10. In the cooling cavity 43, which is not provided with any injection point or injection channel, further cooling and hardening of the main body 40, in particular of its solid handle 2, takes place until there is no risk of deformation when, in a further step, the main body 40 is transferred into a further cavity 44 (see arrow U2 in FIG. 10) into which a second and for example more resiliently elastic material component is injected in order to form the grip part 20. This variant too permits short injection intervals by means of the transfer U1 of the main body 40 into the cooling cavity 43.

FIG. 10 again shows by way of example an injection mold 42 provided for the simultaneous production of 8 toothbrushes. Of course, in all the variants, other mold sizes having another number of cavities (e.g. with 16, or 24 cavities per operating step) are conceivable.

A wide variety of plastics can be used as suitable material components, and these can be at least partially transparent materials, for example styrene-acrylonitrile, polyester, polystyrene, polyamides, polycarbonates, polymethylmethacrylate or others. Examples of opaque materials that can be used are polypropylene, thermoplastic elastomers or polyethylene.

The invention claimed is:

1. A method for producing a toothbrush from at least one material component, comprising:
   injecting the material component for forming a toothbrush handle into a first cavity of an injection mold;
   subsequently transferring the injected material component after partial cooling and hardening into a cooling cavity of the injection mold not provided with any injection point or injection channel in order to further cool and harden the material, whereby no injection-molding operation takes place in the cooling cavity;
   subsequently transferring the further cooled and hardened material component into a third cavity of the injection mold; and
   injecting a second material component into the third cavity into contact with the cooled and hardened material component of the toothbrush handle.

2. A method for producing a toothbrush from at least one material component, comprising:
   injecting a first portion of a first material component for forming a toothbrush handle into a first cavity, thereby forming a part of the toothbrush handle having an injection surface;
   subsequently, upon sufficient cooling and hardening of the first portion of the first material component, transferring the first portion of the first material component into a second cavity; and
   injecting a second portion of the first material component into the second cavity and into contact with the first portion of the first material component to form another part of the toothbrush handle;
   wherein, when injection-molding the second portion of the first material component, a second material component is injected into the second cavity and the second portion of the first material component is injected into the second cavity onto the injection surface of the part of the toothbrush handle injected from the first portion of the first material component, and an area of the second cavity provided for the second portion of the first material component is separated from a further area of the second cavity provided for the second material component by the part previously produced in the first cavity.

3. The method as claimed in claim 2, further comprising injecting a second material component around at least part of the toothbrush handle, wherein the second material component is more elastically resilient that the material component.

4. The method as claimed in claim 2, wherein the material component provided for injection-molding is delivered to the individual first and second cavities from a same unit.

5. The method as claimed in claim 2, wherein the first portion of the material component and the second portion of the material component are delivered to the individual first and second cavities from different units.

6. The method as claimed in claim 2, wherein the material component provided for forming the handle is injected in two portions of approximately equal size.

7. The method as claimed in claim 2, wherein at least one portion of the material component provided for forming the handle is at least partially transparent.

8. The method as claimed in claim 2, further comprising producing a number of toothbrushes simultaneously in a corresponding number of cavities in one injection mold.

9. The method as claimed in claim 2, wherein the second material component and the second portion of the material component are simultaneously injected.

10. The method as claimed in claim 2, wherein the injection surface extends at an inclination relative to a longitudinal direction of the toothbrush.

* * * * *